(12) United States Patent
Iwai et al.

(10) Patent No.: US 10,876,851 B2
(45) Date of Patent: Dec. 29, 2020

(54) ENVIRONMENT ADJUSTMENT SYSTEM, ENVIRONMENT ADJUSTMENT METHOD, AND ENVIRONMENT ADJUSTMENT PROGRAM

(71) Applicant: TOYOTA JIDOSHA KABUSHIKI KAISHA, Toyota (JP)

(72) Inventors: Satoshi Iwai, Okazaki (JP); Koji Yamada, Toyota (JP); Marie Ishikawa, Nagoya (JP); Akinori Sato, Mishima (JP); Hiroyuki Yamada, Nagakute (JP); Akira Shichi, Nagakute (JP); Masanori Ishigaki, Nagakute (JP); Shuji Tomura, Nagakute (JP); Kenji Ito, Nagakute (JP); Reiko Makino, Nagakute (JP); Keisuke Ichige, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 179 days.

(21) Appl. No.: 16/173,178

(22) Filed: Oct. 29, 2018

(65) Prior Publication Data

US 2019/0195646 A1 Jun. 27, 2019

(30) Foreign Application Priority Data

Dec. 27, 2017 (JP) ................. 2017-251867

(51) Int. Cl.
*G01C 21/34* (2006.01)
*G06Q 30/02* (2012.01)
*G01C 21/36* (2006.01)

(52) U.S. Cl.
CPC ..... *G01C 21/3492* (2013.01); *G01C 21/3691* (2013.01); *G01C 21/3697* (2013.01); *G06Q 30/0207* (2013.01)

(58) Field of Classification Search
CPC ............ G01C 21/3492; G01C 21/3691; G01C 21/3697; G06Q 30/0207; G08G 1/0116;
(Continued)

(56) References Cited

U.S. PATENT DOCUMENTS

2006/0069501 A1* 3/2006 Jung ................ G08G 1/096816
701/457
2009/0018902 A1* 1/2009 Miller .................... G06Q 50/30
705/13
(Continued)

FOREIGN PATENT DOCUMENTS

JP 2010-210236 A 9/2010

*Primary Examiner* — Babar Sarwar
(74) *Attorney, Agent, or Firm* — Oliff PLC

(57) ABSTRACT

An environment adjustment system includes an acquisition unit configured to acquire environmental information of an environment related to a user, a drafting unit configured to draft an action plan to recommend to the user based on the environmental information, a transmission unit configured to transmit the action plan to the user's terminal, and a confirming unit configured to confirm whether the user has performed the action plan. When the drafting unit drafts a new action plan for another user or for the user, it drafts the new action plan using a result of the confirmation by the confirming unit.

6 Claims, 11 Drawing Sheets

(58) Field of Classification Search
CPC .. G08G 1/0133; G08G 1/0141; G08G 1/0145; G08G 1/096844; H04W 4/44
See application file for complete search history.

(56) References Cited

U.S. PATENT DOCUMENTS

| | | | |
|---|---|---|---|
| 2010/0262362 A1* | 10/2010 | Naito | G08G 1/096866 |
| | | | 701/424 |
| 2013/0054358 A1* | 2/2013 | Ross | G06Q 30/00 |
| | | | 705/14.53 |
| 2014/0229255 A1* | 8/2014 | Scofield | G06Q 30/0207 |
| | | | 705/14.21 |
| 2015/0032768 A1* | 1/2015 | Miller | G06F 16/2455 |
| | | | 707/769 |
| 2017/0023370 A1* | 1/2017 | Delaney | G01C 21/3492 |
| 2017/0146351 A1* | 5/2017 | von Cavallar | G06Q 50/01 |
| 2017/0147989 A1* | 5/2017 | Onimaru | G01C 21/3492 |
| 2017/0193614 A1* | 7/2017 | Kalyanaraman | G06Q 30/0239 |
| 2017/0316523 A1* | 11/2017 | Jafri | G06Q 10/02 |
| 2018/0101800 A1* | 4/2018 | Lecue | G06F 16/252 |
| 2018/0114170 A1* | 4/2018 | Barry | G06Q 10/06315 |
| 2018/0293595 A1* | 10/2018 | McMaster | H04L 67/22 |
| 2019/0072398 A1* | 3/2019 | Balakrishna | G01C 21/3492 |

* cited by examiner

INDIVIDUAL INFORMATION

| (P1) GEOGRAPHICAL INFORMATION | |
|---|---|
| CURRENT LOCATION S | NORTH LATITUDE XX  EAST LONGITUDE XX |
| DESTINATION G | NORTH LATITUDE XX  EAST LONGITUDE XX |
| (P2) PASSENGER INFORMATION | |
| NUMBER OF PASSENGERS | 4 |
| DISABLED PERSON | NOT INCLUDED |
| (P3) VEHICLE INFORMATION | |
| CRUISE DISTANCE | 150km |
| CONTINUOUS TRAVELED TIME | 45 MINUTES |
| (P4) SELECTED INCENTIVE | |
| I POINT | |

Fig. 4

ENVIRONMENTAL INFORMATION

| (E1) TRAFFIC JAM OCCURRENCE PREDICTION | | |
|---|---|---|
| SECTION J1 | | |
| | PREDICTED OCCURRENCE TIME | 15 MINUTES LATER |
| | PREDICTED END TIME | 120 MINUTES LATER |
| | LEVEL | L1 |
| SECTION J2 | | |
| | PREDICTED OCCURRENCE TIME | 10 MINUTES LATER |
| | PREDICTED END TIME | 60 MINUTES LATER |
| | LEVEL | L2 |
| (E2) PEDESTRIAN INFORMATION (LAST 10 MINUTES) | | |
| SECTION W1 | | 18 |
| SECTION W2 | | 11 |

Fig. 6

PERFORMANCE INFORMATION

| SECTION J1 | |
|---|---|
| AVOIDED | 30 |
| PASSED | 60 |
| SECTION J2 | |
| AVOIDED | 8 |
| PASSED | 12 |

Fig. 7

ENVIRONMENT ADJUSTMENT SYSTEM, ENVIRONMENT ADJUSTMENT METHOD, AND ENVIRONMENT ADJUSTMENT PROGRAM

CROSS REFERENCE TO RELATED APPLICATIONS

This application is based upon and claims the benefit of priority from Japanese patent application No. 2017-251867, filed on Dec. 27, 2017, the disclosure of which is incorporated herein in its entirety by reference.

BACKGROUND

The present disclosure relates to an environment adjustment system, an environment adjustment method, and an environment adjustment program.

A navigation system that presents an optimum route and an arrival time when a driver who drives a vehicle designates a destination is known (e.g., see Japanese Unexamined Patent Application Publication No. 2010-210236).

SUMMARY

Well-known navigation systems can capture traffic information and present a route that avoids traffic jams. However, an object of such a navigation system is to enable each vehicle on which the navigation system is mounted to quickly reach the destination. That is, the known individual navigation system does not include a function to ease a traffic jam and eventually to control a traffic environment of a target area.

The present disclosure has been made to solve such a problem. An object of the present disclosure is to provide an environment adjustment system that enables individual users to achieve their respective objects and also optimizes the entire environments to which the users each a part of.

A first exemplary aspect of the present disclosure is an environment adjustment system including: an acquisition unit configured to acquire environmental information of an environment related to a user; a drafting unit configured to draft an action plan to recommend to the user based on the environmental information; a transmission unit configured to transmit the action plan to the user's terminal; and a confirming unit configured to confirm whether the user has performed the action plan. When the drafting unit drafts a new action plan for another user or for the user, it drafts the new action plan using a result of the confirmation by the confirming unit.

As described above, the system comprehensively drafts the plan and presents it to each user who utilizes a certain environment. Thus, demands among the users can be adjusted to optimize the whole of each of the environments which each of the users is a part of.

Moreover, the system confirms whether the suggested plan has been actually performed the suggested plan and evaluates the influence on the environment, and then drafts a new plan. Thus, the entire environment can be promptly converged to an intended adjusted state.

The above environment adjustment system may include a giving unit configured to give an incentive to the user when the user has performed the presented action plan.

The giving unit can issue points and prize exchange tickets as incentives that can be exchanged for goods, for example, according to the amount of accumulated incentives. Such an incentive giving mechanism motivates the user to perform the action plan even when it is not an optimal action plan for him/her.

At this time, the drafting unit may draft a plurality of the action plans and rank them, the transmission unit may transmit the ranked action plan to a user's terminal, the confirming unit may confirm whether the user has performed any one of the action plans, and the giving unit may give the incentive according to the ranking of the performed action plan. When the system can present the plurality of plans, it is more likely to match the request for environmental adjustment with the desire of each user.

In the above environment adjustment system, the environmental information is traffic information available to the user, and the action plan includes using a recommended transport infrastructure. This system is suitable as a system for adjusting a traffic environment, for example to ease traffic jams in a target area and to optimize energy supply to the vehicle.

In the above environment adjustment system, the acquisition unit may acquire individual information related to the user, and the drafting unit may draft an action plan to recommend to the user based on the environmental information and the individual information. By finely responding each of the user's circumstances in this manner, it is possible to promote the adjustment of the target environment.

At this time, the drafting unit may draft a plurality of the action plans divided stepwise in order to achieve an achievement objective of the user acquired as the individual information, and the confirming unit may confirm whether the user has performed each of the plurality of action plans. By finely dividing the processes until achieving the achievement goal, the user can contribute partly to environmental adjustment. Thus, the system can promote the adjustment of the target environment.

An second exemplary aspect of the present disclosure is an environmental adjustment method including: acquiring environmental information of an environment related to a user; drafting an action plan to recommend to the user based on the environmental information; transmitting the action plan to the user's terminal; and confirming whether the user has performed the action plan. When a new action plan is drafted for another user or the user, the new action plan is drafted using a result of the confirmation by the confirming unit.

A third exemplary aspect of the present disclosure is an environment adjustment program including: acquiring environmental information of an environment related to a user; drafting an action plan to recommend to the user based on the environmental information; transmitting the action plan to the user's terminal; and confirming whether the user has performed the action plan. When a new action plan is drafted for a new action plan to another user or the user, the new action plan is drafted using a result of the confirmation by the confirming unit.

Like the first exemplary aspect, the second and third exemplary aspects can adjust demands among the users to optimize the entire environment. Moreover, the system confirms whether the suggested plan has been actually performed the suggested plan and evaluates the influence on the environment, and then drafts a new plan. Thus, the entire environment can be promptly converged to an intended adjusted state.

The present disclosure enables individual users to achieve their objects and also optimizes a whole of each of environments which each of the users is a part of.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 4 is an example of individual information transmitted from the vehicle to the server;

FIG. 6 is an example of environmental information acquired by the server;

FIG. 7 is an example of performance information acquired by the server from another vehicle;

DESCRIPTION OF EMBODIMENTS

Figure 1:
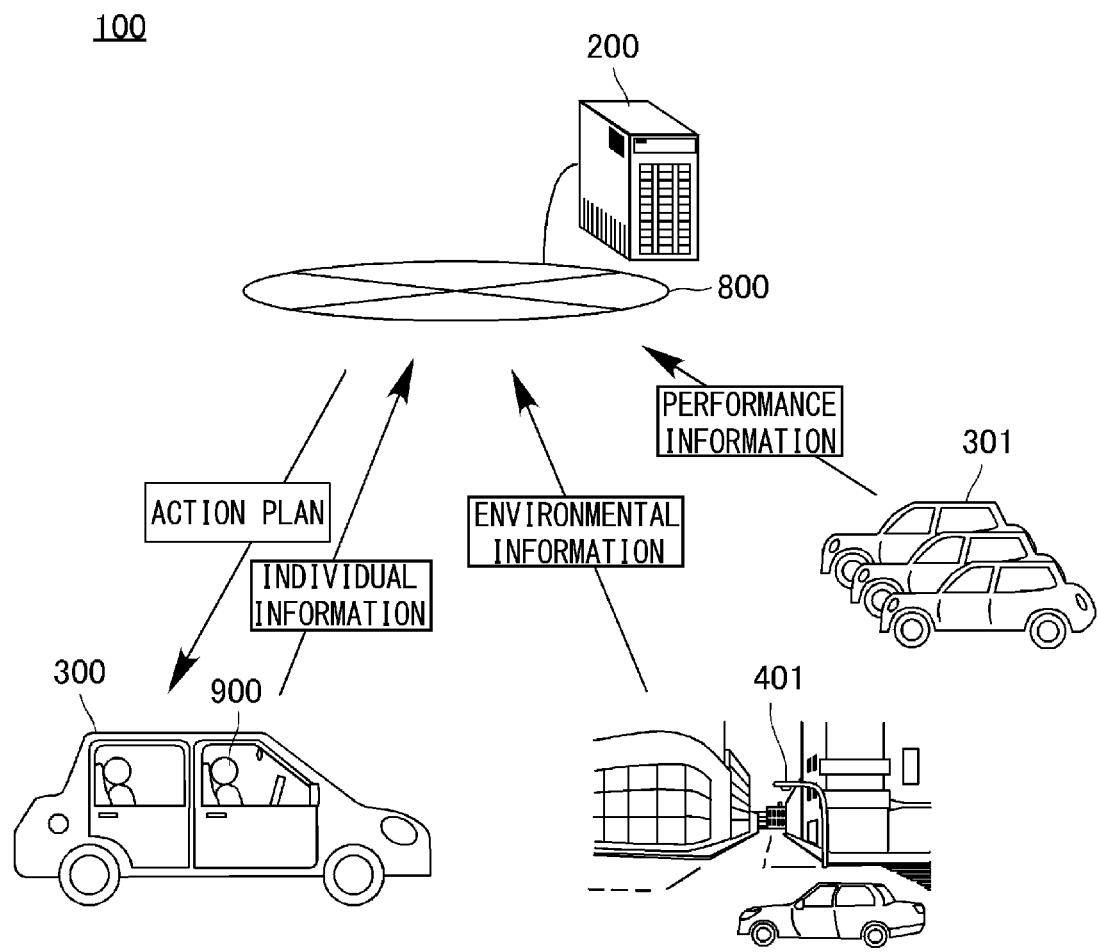
FIG. 1 is a conceptual diagram showing an adjustment system for adjusting a traffic environment according to an embodiment.

FIG. 1 is a conceptual diagram showing an adjustment system 100 according to this embodiment. The adjustment system 100 described as a first example is a traffic environment adjustment system that adjusts a traffic volume of a target area to ease a traffic jam. The adjustment system 100 includes a vehicle 300, which is to be described in this embodiment and on which a user 900 rides, other vehicles 301 on which other users ride, an environment sensor 401 as an IoT device installed in the target area, and a server 200 connected to the vehicles 300 and 301 and the environment sensor 401 via an Internet network 800. The server 200 comprehensively controls the adjustment system 100.

The server 200 acquires individual information related to the vehicle 300 from the vehicle 300 on which the user 900 rides. The server 200 further acquires environmental information related to traffic from the environment sensor 401 installed in the target area for which a traffic volume is to be adjusted. There may be one or more of the environment sensors 401. Further, there may be one or more types of the environment sensors 401. The environment sensor 401 is, for example, a sensor that detects the number of vehicles passing in a certain period of time or a sensor that monitors an amount of snow on the road. The environment sensor 401 is not limited to a sensor that directly detects information related to the traffic and instead may be a sensor that acquires information affecting the traffic, such as a sensor that detects a rainfall amount.

The server 200 acquires performance information from the other vehicles 301 which have already been presented with action plans. The performance information indicates whether each of the other vehicles 301 has performed the action plan. The server 200 analyzes the individual information, the environmental information, and the performance information, drafts the action plan to recommend to the vehicle 300, and presents the action plan to the vehicle 300.

Figure 2:
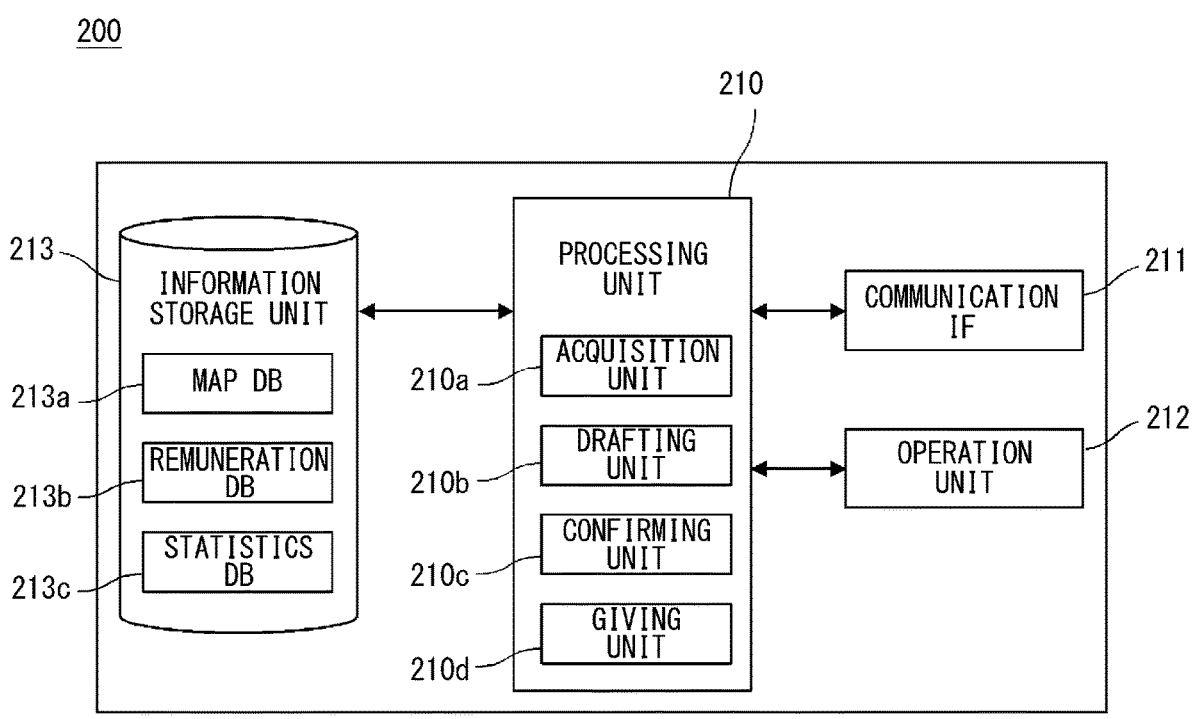
FIG. 2 is a view showing a configuration of a server.

FIG. 2 is a view showing a configuration of the server 200. A processing unit 210 is, for example, an MPU. The processing unit 210 executes control on the server 200 by executing a control program read from a system memory.

A communication IF 211 is a communication interface that includes, for example, a wired LAN interface and is communicably connected to the Internet network 800. The processing unit 210 receives the individual information, the environmental information, and the performance information via the communication IF 211, and transmits the action plan via the communication IF 211. An operation unit 212 is an input device such as a keyboard and a mouse connected to the server main body. A system administrator operates the operation unit 212, for example, when he/she starts or terminates the system, adjusts a parameter value, or modifies a program.

An information storage unit 213 is, for example, an HDD. The information storage unit 213 stores various parameters, data, and a database (DB) that systematically accumulates the parameters and data. The information storage unit 213 stores, for example, a map DB 213a. The map DB 213a is map information of the target area for which the traffic volume is to be adjusted. The map DB 213a may also include associated information such as location information indicating a location where the environment sensor 401 is installed.

The information storage unit 213 further stores a remuneration DB 213b. The remuneration DB 213b stores remuneration information related to incentives, which will be described later. The remuneration information may include, for example, a total amount of remuneration that can be given in the target area, and information of an opponent who is given the remuneration. The information storage unit 213 stores a statistics DB 213c. The statistics DB 213c stores statistical information of traffic events which have occurred in the target area. The statistical information may include, as traffic jam information for each major road, for example, times of day when a traffic jam occurs, a relationship between the traffic jam and the weather, a traffic jam occurrence probability after a certain period of time with respect to a change in the traffic volume, an average speed in the traffic jam, and an average distance.

Note that the information storage unit 213 may not be configured integrally with the server 200. Instead, the information storage unit 213 and the server 200 may be configured in such a way that they are connected to each other via the Internet network 800. It is not necessary for all the DBs to be stored in one information storage unit 213. The information storage unit 213 may be composed of a plurality of storages and one or more DBs may be stored in each of the storages. Moreover, it is not necessary for all the DBs to be configured as a part of the adjustment system 100, and instead the server 200 may use the DB belonging to another system.

The processing unit 210 also functions as a function execution unit which executes various calculations and controls related to processing. An acquisition unit 210a acquires the environmental information from the environment sensor 401 via the communication IF 211 at a timing designated by the control program. Specifically, the acquisition unit 210a collects an output of each environment sensor 401 in such a way that the output conforms to a previously designated format and adjusts it to the environmental information that can be processed in the downstream. At this time, the acquisition unit 210a may refer to the statistical information of the statistics DB 213c to analyze the output of the environment sensor 401 and may use, as the environmental information, a traffic jam occurrence prediction or the like obtained as a result of the analysis. The acquisition unit 210a acquires the individual information from the vehicle 300 via the communication IF 211 in accordance with a transmission request from the vehicle 300 or at a timing designated by the control program.

A drafting unit 210b analyzes the environmental information and the individual information acquired by the acquisition unit 210a and the performance information acquired by a confirming unit 210c, and drafts the action plan for the vehicle 300 to recommend to the user 900. The specific drafting method will be described later. The drafted action plan is transmitted to the vehicle 300 via the communication IF 211 which functions as a transmission unit.

The confirming unit 210c acquires the performance information from the vehicle 300 and the other vehicles 301 after they are presented with the action plans, and confirms whether the vehicle 300 and the other vehicles 301 have performed the action plans. A result of the confirmation is handed over to the drafting unit 210b and the giving unit 210d.

When the vehicle 300 and the other vehicles 301 perform the recommended action plans, the giving unit 210d provides remuneration (incentive), which is indicated in association with the action plan, to the vehicle 300 and the other vehicles 301 via the communication IF 211. The remuneration may be anything as long as it is defined by a format manageable as data. The remuneration may be, for example, a numerical point that can be exchanged for goods or services when certain points are accumulated, or a digital ticket that can be exchanged for specific goods or services. Note that the remuneration is not necessarily provided to the vehicle 300 and the other vehicles 301 and instead may be provided to a data storage previously designated by the user or a management server of a remuneration provider.

Figure 3:
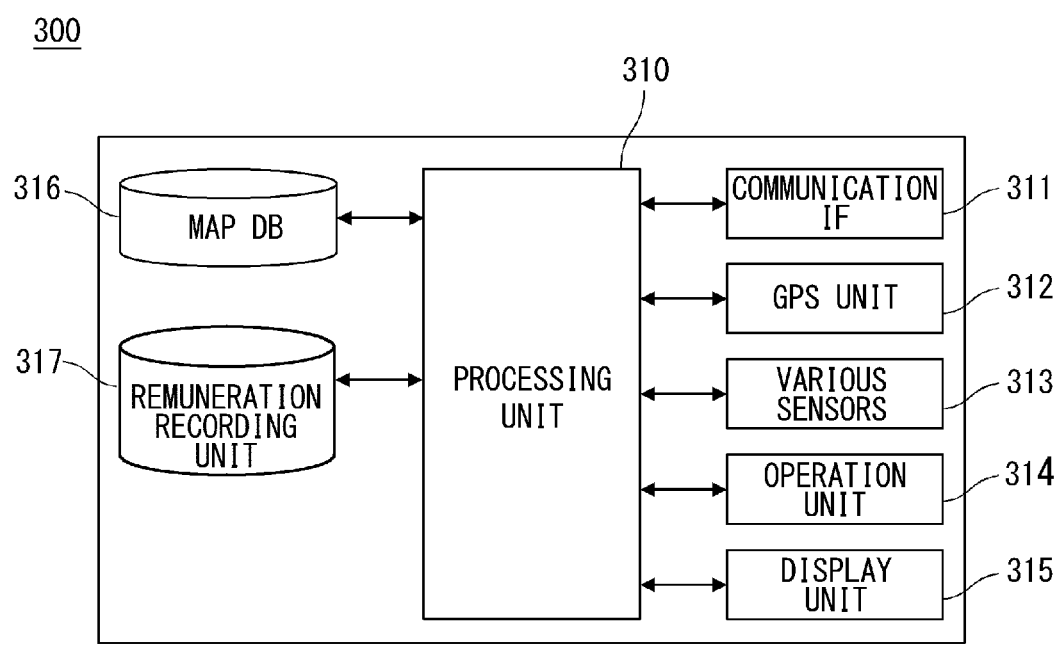
FIG. 3 is a view showing a configuration of a vehicle.

FIG. 3 is a view showing a configuration of the vehicle 300. The vehicle 300 functions as a terminal used by the user with respect to the server 200. The other vehicles 301 have the same configuration as that of the vehicle 300. Thus, the description thereof will be omitted. The processing unit 210 is, for example, an ECU. The processing unit 210 executes the control program read from the system memory to thereby control the vehicle 300.

A communication IF 311 includes, for example, an interface connected to a 4G line and is an on-vehicle communication unit that is communicably connected to the Internet network 800. A GPS unit 312 receives a signal from a GPS satellite and outputs a latitude/longitude at which the vehicle 300 is located. The processing unit 310 acquires an output of the GPS unit 312 and recognizes the current location of the vehicle 300. Various sensors 313 are installed in the vehicle 300. The various sensors 313 include, for example, a remaining capacity detection sensor of a storage battery when the vehicle 300 is an electric vehicle. The processing unit 310 acquires necessary information from the various sensors 313, for example, when it creates the individual information.

An operation unit 314 includes an operation member operated by the user 900. The operation unit 314 detects the operation and outputs it to the processing unit 310. A display unit 315 is, for example, a liquid crystal display. The display unit 315 displays the action plan received from the server 200 in such a manner that the action plan can be recognized by the user 900 or displays a map on which the current location of the vehicle 300 is superimposed.

The map DB 316 is, for example, an HDD. The map DB 316 stores a nationwide map including roads on which automobiles can travel. When the processing unit 310 displays the map or the recommended action plan on the display unit 315, it reads the map of the target area from the map DB 316. The remuneration recording unit 317 is, for example, an HDD. The remuneration recording unit 317 cumulatively records the remuneration given from the server 200. For example, when the user 900 exchanges the accumulated points with goods or services, the remuneration recording unit 317 records the remaining points together with a history of the exchange.

Note that each of the map DB 316 and the remuneration recording unit 317 may be composed of a single storage. Alternatively, at least one of the map DB 316 and the remuneration recording unit 317 may not be mounted on the vehicle 300 and instead may be configured as a cloud storage via the Internet network 800. In such a case, the processing unit 310 performs reading and rewriting via the communication IF 311.

Next, a processing procedure will be described in detail assuming a certain situation. FIG. 4 shows an example of the individual information transmitted from the vehicle 300 to the server. Suppose that the user 900 who drives the vehicle 300 inputs a destination via the operation unit 314 at a certain point of time. Next, the processing unit 310 writes, as (P1) geographical information, the latitude/longitude of a current location S identified from the output of the GPS unit 312 and the latitude/longitude of a destination G input by the user 900 in the individual information. Then, the processing unit 310 writes, as (P2) passenger information, the number of passengers identified from the various sensors 313, for example, an in-vehicle camera, and the presence or absence of a pre-registered disabled person in the individual information.

Furthermore, the processing unit 310 writes, as (P3) vehicle information, a cruise distance that the vehicle can travel in the future and a continuous traveled time so far, which are calculated from the outputs of the various sensors 313, in the individual information. The processing unit 310 further writes, as a (P4) selected incentive, a type of the remuneration previously selected by the user 900 in the individual information. The processing unit 310 transmits the individual information generated in this manner to the server 200 via the communication IF 311.

Figure 5:
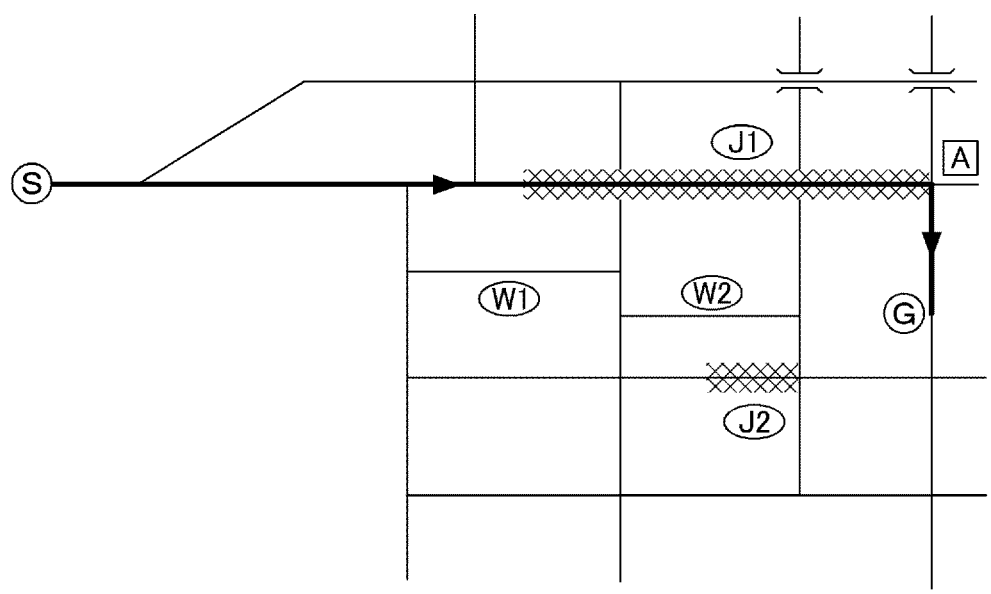
FIG. 5 is a peripheral map showing a shortest route to a destination.

FIG. 5 is a peripheral map showing a shortest route from the current location of the vehicle 300 to the destination. The shortest route indicated by the thick line is a route that travels straight from the current location S, makes a right turn at a point A, and then reaches the destination G. However, the road traveling straight from the current location S is a trunk road, and a section J1, which is a few kilometers from the point A and is indicated by a mesh line, is a section where a traffic jam frequently occurs. Thus, the adjustment system 100 is responsible for a task of reducing the traffic jam occurring in the section J1 in the target area shown in FIG. 5. A section J2 on the illustrated map is also a section where a traffic jam frequently occurs. The adjustment system 100 makes an adjustment to also reduce the traffic jam occurring in the section J2.

Furthermore, sections W1 and W2 on the illustrated map are sections of residential roads. There are sometimes many pedestrians in the sections W1 and W2 depending on the time of day. Further, the adjustment system 100 is responsible for a task of distributing traveling vehicles more safely in association with the task of reducing the traffic jams. That is, the adjustment system 100 attempts to control the passing vehicles in order to optimize the traffic environment in the target area as a whole.

FIG. 6 shows an example of the environmental information acquired by the server 200. As described above, the environmental information is acquired by the acquisition unit 210a acquiring the output of each environment sensor 401 and analyzing the output of the environment sensor 401 with reference to the statistical information in the statistics DB 213c depending on the item.

(E1) The traffic jam occurrence prediction is written for the above-mentioned sections J1 and J2. The acquisition unit 210a uses, for example, an output of a traffic volume sensor provided in each section as the environment sensor 401 and a traffic jam record at the same time in the past as the present time to calculate a predicted occurrence time of the traffic jam, a predicted end time of the traffic jam, and a level of the traffic jam. (E2) Pedestrian information is written for the above-mentioned sections W1 and W2. The acquisition unit 210a calculates the number of pedestrians who passed in the past ten minutes, for example, using an output of a pedestrian number sensor provided in each section as the environment sensor 401.

FIG. 7 shows an example of the performance information acquired from the other vehicle 301 by the server 200. It is difficult to accurately predict the state when the vehicle 300 reaches the corresponding section only from the past statistical information (traffic jam record) and current traffic information. That is, when the adjustment system 100 has already recommended the action plan that avoids the sections J1 and J2 to the other vehicles 301 in order to prevent a traffic jam from occurring, and when many of the other vehicles 301 actually avoid the sections J1 and J2, it is less likely that the traffic jams occurs in the sections J1 and J2. In this case, the adjustment system 100 can recommend, to the vehicle 300, the action plan that passes through the section J1. That is, the traffic jam prediction of the target section greatly changes according to the performance histories of the other vehicles 301 that have already been recommended with the action plans. Thus, the adjustment system 100 drafts the action plan to recommend to the vehicle 300 in consideration of the performance information acquired from the other vehicles 301.

The performance information indicates how far the action plan avoiding the sections J1 and J2 has been performed. The performance information of each of the other vehicles 301 collected by the confirming unit 210c is accumulated and converted to generate the performance information. In the performance information generated in this manner, the number of vehicles that avoided to pass through the sections J1 and J2 and the number of vehicles that passed through the sections J1 and J2 are written. Note that when the other vehicle 301 is recommended with the recommended action plan that avoids the section J1 and passes through the section J2 and the other vehicle 301 has performed according to the recommended action plan, an avoiding count is incremented by one for avoiding the section J1, and a passage count is incremented by one for passing through the section J2 in the performance information.

Figure 8A:
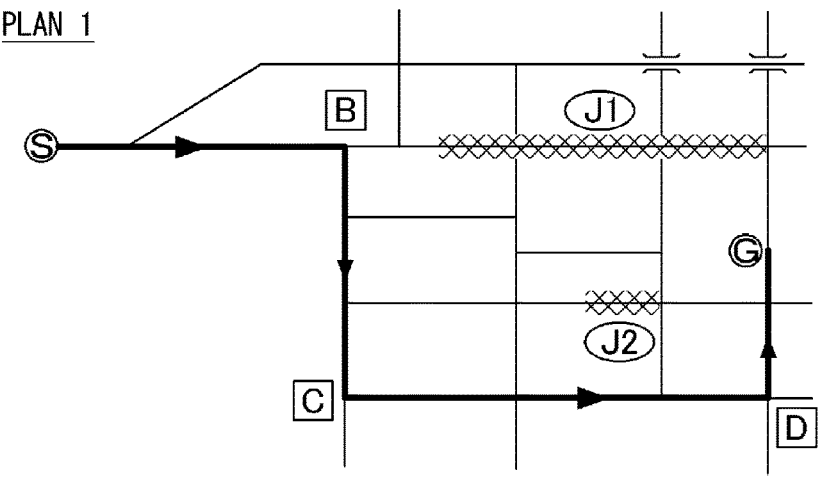
FIG. 8A is an example of an action plan drafted by the server.
Figure 8B:
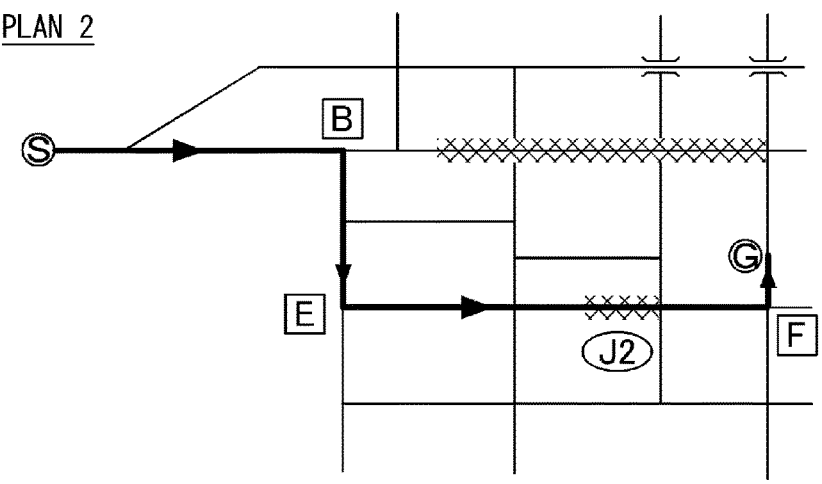
FIG. 8B is example of the action plan drafted by the server.
Figure 8C:
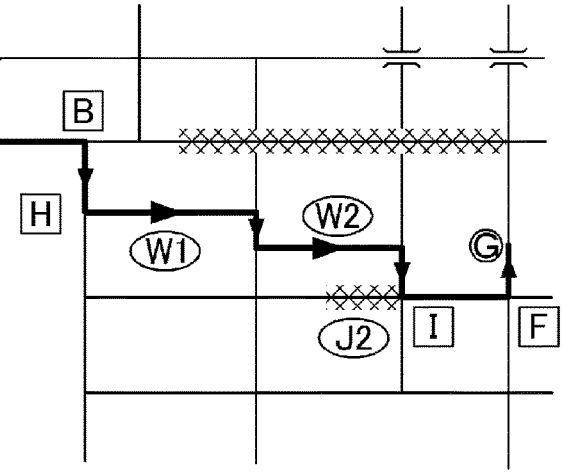
FIG. 8C is an example of the action plan drafted by the server.

The drafting unit 210b predicts a state of the traffic jam when the vehicle 300 passes through the sections J1 and J2 taking the performance information generated in this manner into consideration in addition to the environmental information and the individual information, and drafts a plurality of action planes to recommend to the vehicle 300. FIG. 8A to FIG. 8C are examples of the action plan drafted by the drafting unit 210b of the server 200.

FIG. 8A shows a Plan 1 which is the action plan ranked first among the recommended action plans. The Plan 1 selects a route that avoids both the section J1 and J2. In other words, the drafting unit 210b determines that when the vehicle 300 travels straight and enters the section J1, it will be caught up in the traffic jam or cause the traffic jam. The same applies to J2. Specifically, the Plan 1 turns right at a point B before the section J1 and reaches the destination G via points CD that avoid the section J2. The drafting unit 210b allocates relatively large remuneration to the Plan 1, which greatly contributes to avoiding the traffic jams in the sections J1 and J2 and is a detour route not usually selected under a normal situation. In this case, 40p is allocated as an I point which is the incentive selected by the user 900.

FIG. 8B shows a Plan 2 which is the action plan ranked second among the recommended action plans. The Plan 2 selects a route that avoids the section J1 but passes through the section J2. Specifically, the Plan 2 turns right at the point B before the section J1 and reaches the destination G via the points EF including the section J2. The drafting unit 210b allocates moderate remuneration to the Plan 2, which contributes to avoiding the traffic jam in the section J1 but does not contribute to avoiding the traffic jam in the section J2. In this case, 20p is allocated as the I point.

FIG. 8C shows a Plan 3 which is the action plan ranked third among the recommended action plans. The Plan 3 selects a route that avoids the sections J1 and J2 but passes through the sections W1 and W2 where there are comparatively many pedestrians. Specifically, the Plan 3 turns right at the point B before the section J1 and reaches the destination G via points HI including the sections W1 and W2. The drafting unit 210b predicts that there may be a certain number of pedestrians in the sections W1 and W2 from the pedestrian information, and thus it determines that it is better to avoid passing through the sections W1 and W2 as much as possible. Thus, the drafting unit 210b allocates the least remuneration among the recommended action plans to the Plan 3, which contributes to avoiding the traffic jams in the sections J1 and J2 but passes through the sections W1 and W2 where there are a certain number of pedestrians expected. In this case, 10p is allocated as the I point.

Figure 9:
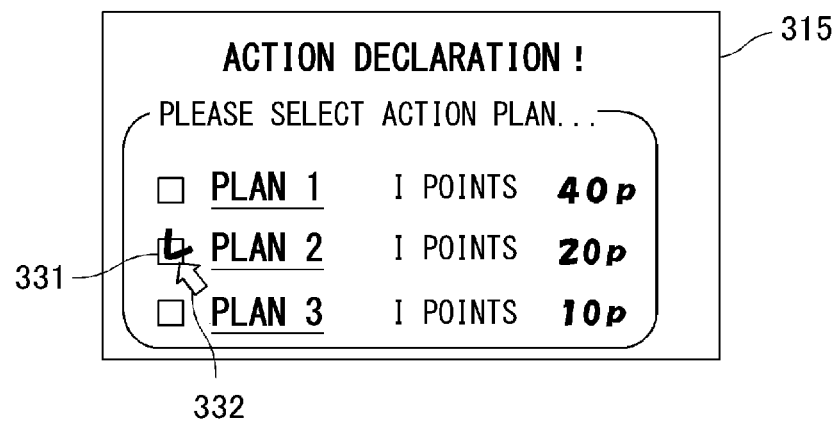
FIG. 9 is an example of a selection screen displayed on a display unit of the vehicle.

FIG. 9 shows an example of a selection screen displayed on the display unit 315 of the vehicle 300. When the processing unit 310 of the vehicle 300 receives the plurality of action plans from the server 200, it sequentially displays the action plans of FIGS. 8A, 8B, and 8C on the display unit 315 and then displays the selection screen of FIG. 9. For example, the user 900 can select the Plan 2 by operating the operation unit 314 and moving a cursor 332 to a checkbox 331 of the Plan 2 to set it checked. The processing unit 310 assumes that the user 900 has declared that he/she will perform the Plan 2, generates a declaration signal indicating that the Plan 2 has been selected, and then transmits the declaration signal to the server 200.

Figure 10:
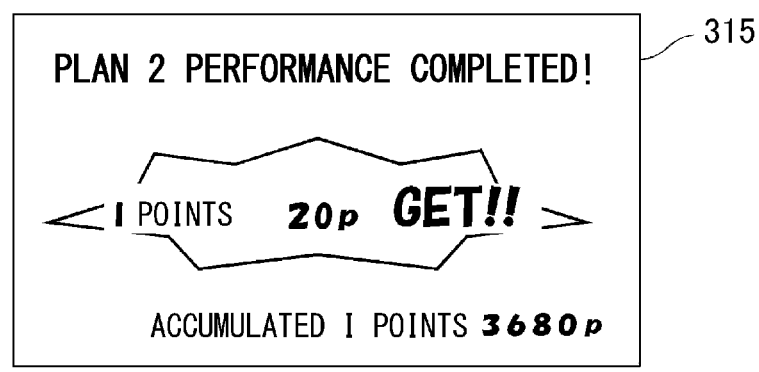
FIG. 10 is an example of a performance completion screen displayed on the display unit of the vehicle.

FIG. 10 shows an example of a performance completion screen displayed on the display unit 315 of the vehicle 300.

For example, when the user 900 selects the Plan 2 and drives according to the Plan 2, the processing unit 310 can confirm that GPS information (a vehicle traveled route) acquired while the vehicle is traveling matches the route designated by the Plan 2. When the processing unit 310 confirms the match, it generates the performance information indicating that the action plan of the Plan 2 has been performed and transmits the performance information to the server 200 via the communication IF 311. When the confirming unit 210c of the server 200 receives the performance information, the giving unit 210d transmits, to the vehicle 300, the remuneration information about the remuneration provided for the Plan 2 to the vehicle 300. When the processing unit 310 of the vehicle 300 receives this remuneration information, it displays the performance completion screen shown in FIG. 10 on the display unit 315. Specifically, as shown in the drawing, the points acquired by performing the Plan 2 and the total points accumulated so far are displayed.

When the vehicle 300 travels on a route different from the action plan selected by the user 900, the processing unit 310 generates the performance information indicating that the selected action plan is not performed when the vehicle 300 reaches the destination G or when the vehicle 300 goes outside the target area. Then, the processing unit 310 transmits the performance information to the server 200. The performance information at this time includes information about whether the vehicle 300 has passed through the sections J1 and J2. Hence, the server 200 can manage the number of vehicles that have avoided the sections J1 and J2, and the number of vehicles that have passed through the sections J1 and J2 as the converted performance information shown in FIG. 7.

The drafting unit 210b analyzes the performance information collected from the other vehicles 301 and the vehicle 300 and drafts the next action plan using the result of the analysis. Although the performance information is used to indicate whether the traveling of the section of interest is avoided as described above, the usage thereof is not limited to this. For example, when a performance rate of a drafted action plan is low, the drafting unit 210b may lower the probability of presenting this action plan. Specifically, when the action plan is presented to another vehicle in a similar situation, the drafting unit 210b lowers the priority of presenting this action plan or presents another action plan instead of this action plan. Alternatively, the incentive for the action plan with a low performance rate may be increased, while the incentive for the action plan with a high performance rate may be reduced. It is obvious that as a result of analyzing the performance information, when it can be determined that the corresponding traffic environment has been improved or it can be predicted that the corresponding traffic environment will be improved, the probability of presenting the action plan that has been presented so far may be reduced or another action plan may be more actively presented.

The traffic jams in the frequently jammed sections J1 and J2 that are included in the target area can be effectively prevented from occurring by controlling the traffic environment of the target area by the adjustment system 100 in this manner. Further, by reducing the traffic volumes of the sections W1 and W2 where there are many pedestrians, safety of the target area can be ensured.

Note that the recommended action plan can be changed according to the level of consideration given to the items acquired as the individual information and the environmental information, when these items are to be taken into consideration. For example, a vehicle having a large number of passengers may be preferentially guided to pass through a section where a traffic jam is expected to occur. The adjustment system 100 guides the vehicle having a small number of passengers to avoid the corresponding section and the vehicle having a large number of passengers to pass through the corresponding section. By doing so, the number of passengers to be transported per unit time in the corresponding section can be increased. It is also possible to recommend the action plan that can move in a shorter period of time to the vehicle on which a disabled person is riding, or recommend the action plan that detours to the vehicle having a longer cruise distance.

When the adjustment system 100 confirms rain from the environment sensor 401, it may estimate the probability that the traffic jam occurs to be high in order to guide more vehicles to avoid the frequently jammed section or may estimate that the number of pedestrians will decrease and guide more vehicles to a residential road section. When the adjustment system 100 determines that the probability that the traffic jam occurs is high, it may increase the remuneration so that the vehicle becomes more likely to perform according to the action plan. Each item acquired as the individual information and the environmental information shown in this example is merely one example, and other items may be acquired as materials for drafting the action plan.

Figure 11:
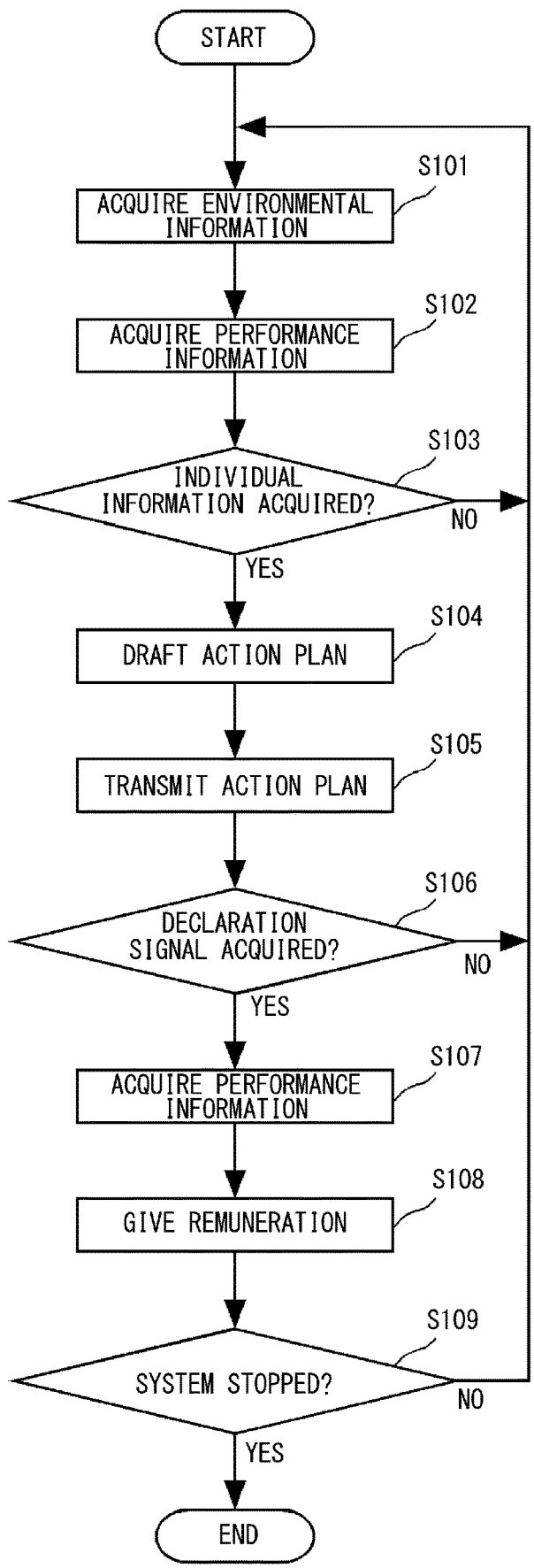
FIG. 11 is a flowchart showing processing executed by the server.

Next, a series of processing in this example will be described. FIG. 11 is a flowchart showing processing executed by the server 200. In Step S101, the acquisition unit 210a collects the output of the environment sensor 401 installed in the target area where the traffic environment is to be adjusted and generates the environmental information. The server 200 can acquire the environmental information through this processing. The processing unit 210 may add to and modify the statistical information using the output of the environment sensor 401.

In Step S102, the confirming unit 210c acquires the performance information from the other vehicles 301 that have been presented with the action plans, and confirms whether each of the other vehicles 301 has performed the action plan. Then, the individual performance information collected from each of the vehicles is converted into the performance information for an object to be monitored in the target area (e.g., the above sections J1 and J2).

In Step S103, the acquisition unit 210a confirms whether the individual information is acquired from the vehicle 300. When the individual information is not acquired from the vehicle 300, the process returns to Step S101, while when the individual information is acquired from the vehicle 300, the process proceeds to Step S104. After the process proceeds to Step S104, the drafting unit 210b uses the environmental information acquired in Step S101, the performance information converted in Step S102, and the individual information confirmed to be acquired in Step S103 to draft the action plan to recommend to the vehicle 300. Then, in Step S105, the processing unit 210 transmits the drafted action plan to the vehicle 300.

In Step S106, the processing unit 210 confirms whether or not the declaration signal, which is a declaration for performing the recommended action plan, has been received from the vehicle 300 within a predetermined period of time. When the declaration signal is not received, the process returns to Step S101, while when the declaration signal is received, the process proceeds to Step S107. When the process proceeds to Step S107, the confirming unit 210c acquires the performance information from the vehicle 300 after a certain period of time. Then, in Step S108, when the giving unit 210*d* can confirm that the vehicle 300 acted according to the action plan, it gives the remuneration to the vehicle 300. Further, the giving unit 210*d* reflects the giving record on the remuneration DB 213*b*.

The processing unit 210 proceeds to Step S109 and determines whether the system is stopped. When the system is stopped, the process returns to Step S101, while when the system is stopped, the termination process is executed and the series of processes is terminated.

Note that in this embodiment, the vehicle 300 and the other vehicles 301 are distinguished from each other in order to make the flow of the processing easier to understand. However, these vehicles viewed from the server 200 are uniform. Thus, any vehicle that the server 200 transmits the action plan can be the vehicle 300, and any vehicle contributing to the generation of the performance information to be referred to when the action plan is drafted can be the other vehicle 301. That is, when a vehicle is in a position that accepts and performs the action plan, the vehicle become the vehicle 300. On the other hand, when a vehicle provides the performance information for drafting the action plan for other vehicles, the vehicle becomes the other vehicle 301.

When the vehicle 300 is continuously presented with new action plans, the previous performance information of the vehicle 300 may be used to draft the new action plans. For example, when the user 900 sets a destination far away, the adjustment system 100 can set one or more intermediate points until the vehicle 300 reaches the destination. In such a case, the drafting unit 210*b* drafts a plurality of the action plans divided stepwise for each intermediate point and presents them to the user 900. For example, when two intermediate points are set before the destination, a first action plan from a departure point to a first intermediate point, a second action plan from the first intermediate point to a second intermediate point, and a third action plan from the second intermediate point to the destination are drafted and presented to the user 900. As in the above-described examples, for example, a plurality of action plans may be presented as the first action plan to allow the user 900 to select one of them.

When the stepwise action plans are presented in this way, the confirming unit 210*c* confirms whether each action plan has been performed. In such a case, the drafting unit 210*b* can draft, for example, the action plan presented secondly based on a result of the performance of the action plan presented first. When the adjustment system 100 repeats the confirmation of the performance information and drafts the action plan in this manner, it can draft the action plan that the user 900 is likely to perform, thereby eventually controlling the traffic environment of the target area in a more sophisticated manner.

Figure 12:
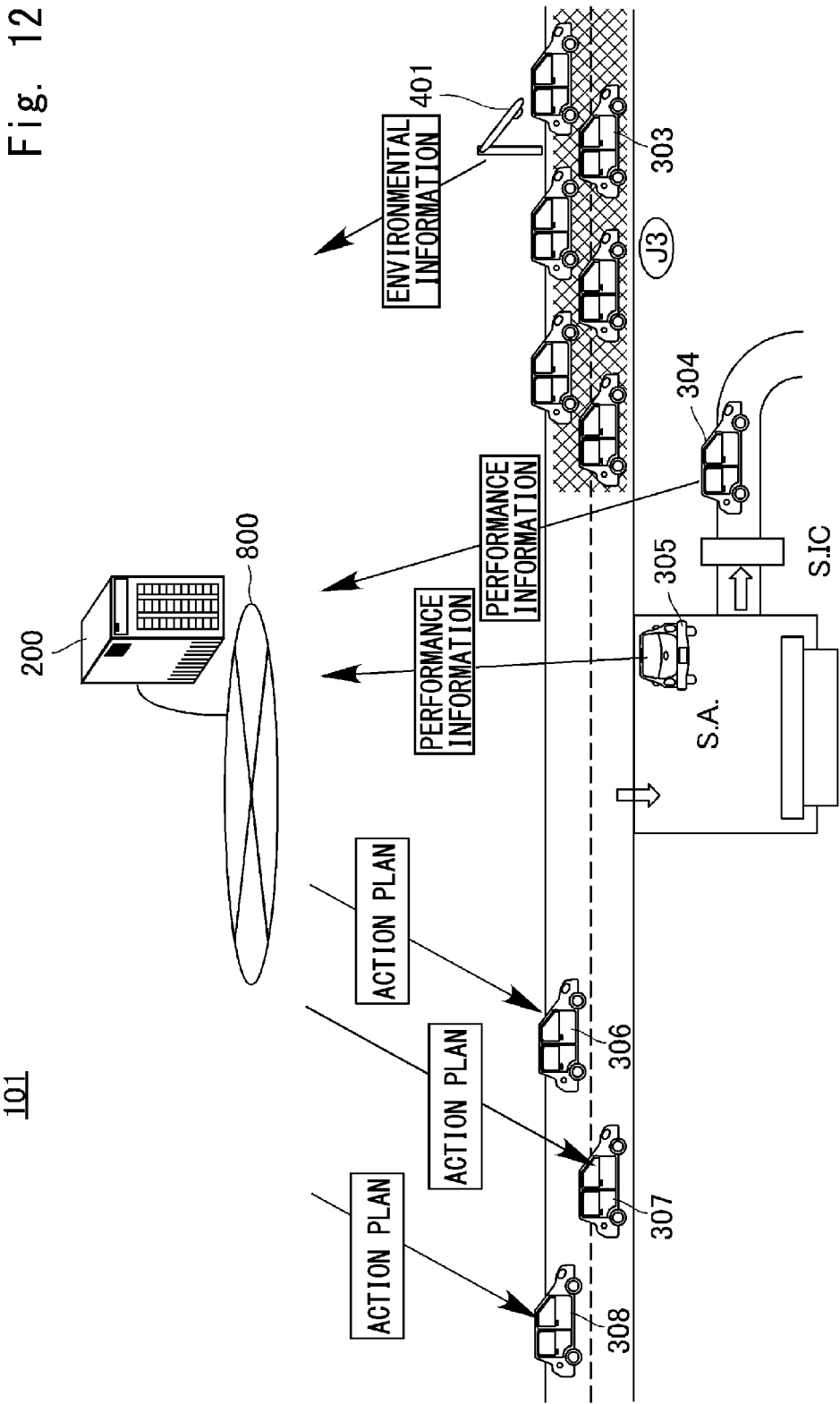
FIG. 12 is a view for describing an adjustment system according to another example.

Next, a second example will be described. FIG. 12 is a view for describing an adjustment system 101 according to the second example. The adjustment system 101 adjusts traffic environment that is more local than the traffic environment adjusted by the adjustment system 100. The adjustment system 100 acquires the individual information from the vehicle 300 and presents the action plan. On the other hand, the adjustment system 101 differs from the adjustment system 100 in that it does not necessarily acquire the individual information. The configuration of the server 200 is substantially the same as that of the server 200 according to the first example except for handling of the individual information.

An object of the adjustment system 101 is to ease traffic jams on expressways. The environment sensor 401 is installed along the expressways. The environment sensor 401 observes passing vehicles. A service area (S.A.) is established on the side of the expressway. The drivers temporarily park and can take a break at the service area. In this case, a smart interchange (S.IC) that allows drivers to exit from the service area to the ordinary roads. The drivers can also exit to the ordinary roads from the smart interchange.

When the adjustment system 101 predicts or detects an occurrence of a traffic jam in a section J3 that is located ahead of the service area from the environmental information generated by collecting the output of the environment sensor 401, it makes an adjustment to ease the traffic jam. Specifically, when an unsupported vehicle 303, which is not presented with the action plan, reaches the section J3, and the environment sensor 401 detects a level of the traffic jam, the processing unit 210 presents the action plans to target vehicles 306, 307, and 308 that are going to head for the section J3.

Specific candidates of the action plan are, for example, "take a break for a certain period of time at the service area" and "exit from the smart interchange to the ordinary roads". The drafting unit 210*b* acquires the performance information from suggested vehicles 304 and 305, which have already been presented with the action plans, and drafts the action plans to be presented to the target vehicles 306, 307, and 308 taking the performance information of the vehicles 304 and 305 into consideration. Specifically, the drafting unit 210*b* takes the number of vehicles traveling in the section J3, the number of vehicles already parked in the service area, and the number of vehicles exiting to frontage roads into consideration to determine the time to take a break in the service area or a proportion of vehicles to be guided to exit to the frontage roads. At this time, the remuneration may be a coupon for a restaurant in the service area or a discount on a toll collected at the time of exiting from the smart interchange.

When the action plans are presented all together without considering the individual information in this manner, it is possible to efficiently adjust the traffic environment, such as a traffic jam that occurs the most recently. It is obvious that the action plan to be presented is decided by taking the individual information into consideration. For example, when the individual information indicating that the vehicle plans to exit at an interchange within 30 km is acquired, it is possible to recommend to exit from the smart interchange instead of taking a break at the service area.

Figure 13:
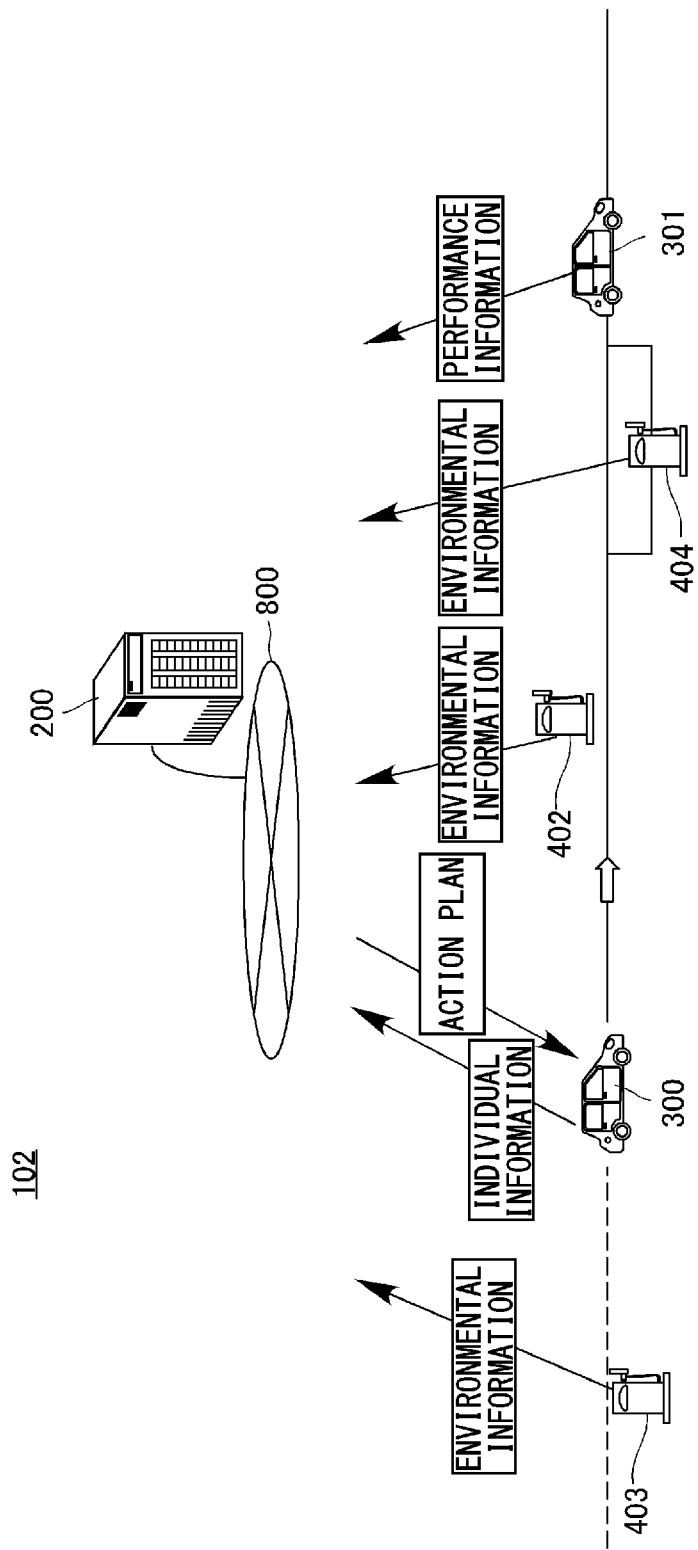
FIG. 13 is a view for describing an adjustment system according to yet another example.

Next, a third example will be described. FIG. 13 is a view for describing an adjustment system 102 according to the third example. The adjustment system 102 optimizes energy supply to a vehicle in a target area. A configuration of the server 200 is substantially the same as that of the server 200 according to the first example. Here, electric vehicles or plug-in hybrid vehicles are assumed to be the target vehicles.

A charging station 402 is present in a direction in which the vehicle 300 travels and a charging station 403 is present in a place the vehicle 300 has already passed along the road on which the vehicle 300 travels. A charging station 404 is present on a side road in the direction in which the vehicle 300 travels. Each storage battery of the charging stations 402, 403, and 404 is charged with renewable energy such as energy generated by photovoltaic power or wind power. Thus, the amount of electric power that can be supplied to the vehicle varies greatly depending on the weather and the like.

The acquisition unit 210*a* acquires, from each of the charging stations 402, 403, and 404, the amount of electric power that can be supplied as the environmental information. Further, the confirming unit 210c acquires the performance information from the other vehicle 301 and confirms whether the action plans that recommend the other vehicles 301 to charge at a specific charging station has been performed. When the acquisition unit 210a acquires the individual information indicating that the user of the vehicle 300 wants to charge the vehicle 300, the drafting unit 210b analyzes the environmental information, the performance information, and the individual information to draft the action plan indicating which charging station the vehicle 300 should charge at. Specifically, the recommended charging station and the remuneration are decided in consideration of a remaining battery capacity of the vehicle 300 described in the individual information, the level indicating how tight the supplyable electric power of the closest charging station 402 is, and the probability of selecting the charging station on the side road and the charging station already passed.

The adjustment system 102 configured as described above can efficiently distribute unreliably accumulated electric power to each vehicle, which eventually contributes to a widespread use of the renewable energy. This enables the user who drives a vehicle to make a social contribution of actively using the renewable energy and to obtain an actual profit, i.e., the remuneration.

In each of the above-described examples, an exemplary aspect in which the user selects the desired action plan from among the plurality of action plans presented by the environment adjustment system to the user has been described. However, the processing unit 310 of the vehicle 300 may sometimes automatically select the action plan. For example, the processing unit 310 analyzes the user's tastes estimated from histories so far, information set by the user, etc., and automatically selects the action plan that matches his/her tastes from the plurality of action plans presented by the server 200. In this case, the user can omit an active operation such as operating the operation unit. Thus, the user can concentrate on driving while driving. For example, when there is no command from the user within a certain period of time, the processing unit 310 selects one of the presented action plans and transmits a result of the selection to the server 200.

Although this embodiment has been described through the three examples, an application range of the environment adjustment system is not limited to the above examples. This embodiment can be applied to a system aimed at preventing accidents and eliminating illegal activities in addition to the system for easing traffic jams and optimizing energy supply. This embodiment is not limited to improving the traffic environment but can also be used as a system for adjusting resident behaviors in specific areas. For example, this embodiment can present the action plan to the user who acts on foot via a mobile terminal such as a smartphone.

In this embodiment, an example in which one server controls the entire system has been described. However, for example, the drafting unit 210b and the giving unit 210d may be composed of different servers. For example, the incentives are provided by a sponsor such as a company or a country. An operator who manages the incentives may manage the server of the giving unit 210d and the remuneration DB 213b. In this embodiment, the remuneration such as points, coupons, and discounts that can be exchanged for goods and services are described as the incentives. However, the remuneration is not limited to them and instead may be any form as long as it motivates the user to act. The incentives are not indispensable in terms of promoting the user to execute the recommended active plan, because the incentives are meant to be a motivation to act. For example, it may be a system that appeals to the user's self-esteem that he/she contributes to adjustment of the traffic environment.

The programs can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An environment adjustment system comprising:
an acquisition unit configured to acquire environmental information of an environment related to a user;
a drafting unit configured to draft a plurality of action plans based on the environmental information,
wherein the drafting unit ranks the plurality of action plans such that the greater a contribution to avoiding traffic congestion, the greater an incentive to be given to the user;
a transmission unit configured to transmit the ranked plurality of action plans to the user's terminal;
a confirming unit configured to confirm whether the user has performed at least one of the plurality of action plans; and
a giving unit configured to give the incentive to the user when the user has performed the at least one of the plurality of action plans,
wherein when the drafting unit drafts a new action plan for another user or for the user, the drafting unit drafts the new action plan using a result of the confirmation by the confirming unit, and
wherein the giving unit gives the incentive according to the ranking of the performed at least one of the plurality of action plans when the user has performed the at least one of the plurality of action plans.

2. The environment adjustment system according to claim 1, wherein
the environmental information is traffic information available to the user, and
the plurality of action plans includes using a recommended transport infrastructure.

3. The environment adjustment system according to claim 1, wherein
the acquisition unit acquires individual information related to the user, and the drafting unit drafts the plurality of action plans to recommend to the user based on the environmental information and the individual information.

4. The environment adjustment system according to claim 3, wherein
the drafting unit drafts the plurality of action plans divided stepwise in order to achieve an achievement objective of the user acquired as the individual information, and
the confirming unit confirms whether the user has performed each of the plurality of action plans.

5. An environment adjustment method comprising:
acquiring environmental information of an environment related to a user;
drafting a plurality of action plans based on the environmental information;
ranking the plurality of action plans such that the greater a contribution to avoiding traffic congestion, the greater an incentive to be given to the user;
transmitting the ranked plurality of action plans to the user's terminal;
confirming whether the user has performed at least one of the plurality of action plans; and
giving the incentive to the user when the user has performed the at least one of the plurality of action plans,
wherein when a new action plan is drafted for another user or the user, the new action plan is drafted using a result of the confirming;
wherein the giving includes giving the incentive according to the ranking of the performed at least one of the plurality of action plans when the user has performed the at least one of the plurality of action plans.

6. A non-transitory computer readable medium storing an environment adjustment program that causes a computer to execute:
acquiring environmental information of an environment related to a user;
drafting a plurality of action plans based on the environmental information;
ranking the plurality of action plans such that the greater a contribution to avoiding traffic congestion, the greater an incentive to be given to the user;
transmitting the ranked plurality of action plans to the user's terminal;
confirming whether the user has performed at least one of the plurality of action plans; and
giving the incentive to the user when the user has performed the at least one of the plurality of action plans,
wherein when a new action plan is drafted for another user or the user, the new action plan is drafted using a result of the confirming;
wherein the giving includes giving the incentive according to the ranking of the performed at least one of the plurality of action plans when the user has performed the at least one of the plurality of action plans.

* * * * *